(12) United States Patent
Noh et al.

(10) Patent No.: US 7,896,534 B2
(45) Date of Patent: Mar. 1, 2011

(54) BACK LIGHT UNIT AND MANUFACTURING METHOD THEREOF

(75) Inventors: Jae Heon Noh, Yongin-si (KR); Dong Seob Jang, Seoul (KR); Seong Ho Youn, Suwon-si (KR); Jong Il Kim, Anyang-si (KR); Sun Gil Kim, Suwon-si (KR); Chang Hyun Kim, Suwon-si (KR)

(73) Assignee: Samsung Electronics Co., Ltd., Suwon-Si (JP)

( * ) Notice: Subject to any disclaimer, the term of this patent is extended or adjusted under 35 U.S.C. 154(b) by 227 days.

(21) Appl. No.: 12/155,830

(22) Filed: Jun. 10, 2008

(65) Prior Publication Data

US 2009/0067193 A1    Mar. 12, 2009

(30) Foreign Application Priority Data

Sep. 7, 2007 (KR) .................. 10-2007-0090934

(51) Int. Cl.
*F21V 7/04* (2006.01)
(52) U.S. Cl. ............ 362/609; 362/632; 362/633; 349/58
(58) Field of Classification Search .................. 362/632, 362/633, 609; 349/58; 65/386; 264/1.24
See application file for complete search history.

(56) References Cited

U.S. PATENT DOCUMENTS

| 7,024,765 | B2 * | 4/2006 | Sakakibara | 29/856 |
| 7,473,023 | B2 * | 1/2009 | Chun et al. | 362/634 |
| 2008/0186732 | A1 * | 8/2008 | Awai et al. | 362/609 |

FOREIGN PATENT DOCUMENTS

| CN | 1696783 | 11/2005 |
| KR | 10-2006-0093956 | 8/2006 |

OTHER PUBLICATIONS

Chinese Office Action dated Dec. 4, 2009 in Chinese Application No. 200810131807.3.

* cited by examiner

*Primary Examiner* — Stephen F Husar
(74) *Attorney, Agent, or Firm* — Staas & Halsey LLP

(57) ABSTRACT

A back light unit and a manufacturing method thereof capable of improving efficiency of a manufacturing process are disclosed. The back light unit includes a light source, a light guiding plate which uniformly transmits a light beam generated by the light source, and a cover portion which forms an external appearance and fixes the light guiding plate, wherein a resin material is charged between the light guiding plate and the cover portion to couple the light guiding plate and the cover portion.

16 Claims, 3 Drawing Sheets

BACK LIGHT UNIT AND MANUFACTURING METHOD THEREOF

CROSS-REFERENCE TO RELATED APPLICATIONS

This application claims the priority benefit of Korean Patent Application No. 2007-0090934, filed on Sep. 7, 2007 in the Korean Intellectual Property Office, the disclosure of which is incorporated herein by reference.

BACKGROUND

1. Field

Embodiments relate to a back light unit and a manufacturing method thereof, and, more particularly, to a back light unit and a manufacturing method thereof capable of reducing the number of constituent components and improving efficiency of a manufacturing process.

2. Description of the Related Art

Recently, as a personal computer, television or the like becomes light and thin, a display device is also required to be light and thin. According to such a demand, a flat panel display such as a liquid crystal display (LCD) device has been developed instead of a cathode ray tube (CRT).

The liquid crystal display device is a display device in which an electric field is applied to a liquid crystal material having an anisotropic dielectric constant, which is injected between two substrates. The intensity of the electric field is adjusted to adjust the amount of light which is transmitted from an external light source (back light) to the substrate to thereby obtain desired image signals.

The liquid crystal display device is a typical one among portable flat panel display devices. Among them, TFT-LCD using a thin film transistor (TFT) as a switching device is mainly used.

The liquid crystal display device includes a liquid crystal display panel to display images; a gate driver driving unit to supply a scanning signal to the liquid crystal display panel; a source driver to supply a data signal to a pixel selected for the scanning signal; a back light unit to irradiate red (R), green (G) and blue (B) light to the liquid crystal display panel; a back light controller to control the back light unit; and a timing controller to supply control signals for controlling the liquid crystal display panel, the gate driver, the source driver and the back light controller.

In relation to the back light unit, the liquid crystal display device is a display device to display various types of information, but it is a non-luminous body incapable of emitting light. Accordingly, it is necessary for an additional device to lighten the liquid crystal display panel by placing a light source on a rear surface of the liquid crystal display panel. The back light unit performs such a function.

However, in the conventional back light unit, a reflecting plate, a mold frame and a bezel are separated from each other. Accordingly, since the steps and the assembling process are complicated, it takes a lot of cost and the back light unit has a large thickness. Further, since the mold frame is made of a plastic material, the loss of light generated at an edge portion of the back light unit brings a reduction of brightness.

In order to solve such problems, Korean Patent Laid-open Publication No. 10-2006-93956 discloses a back light unit of a liquid crystal display device including a light guiding plate which is disposed on a rear surface of a liquid crystal display panel to uniformly transmit a light beam; a lamp which generates the light beam at a periphery of the light guiding plate; a diffusion sheet which diffuses the light beam passing through the light guiding plate; a prism sheet which controls a traveling direction of the light beam passing through the diffusion sheet; and an integrated reflective member which reflects the light beam to the light guiding plate and supports the light guiding plate, the lamp, the diffusion sheet and the prism sheet.

In the back light unit disclosed in the Publication, the integrated reflective member functioning as the bezel, the reflecting plate and the mold frame is manufactured of metal having an excellent reflectivity, thereby simplifying the assembling process and reducing the cost.

However, an additional reflecting plate should be provided in the integrated reflective member and be coupled to the bezel, and an operation for coupling the light guiding plate should be performed. Accordingly, there are problems such that the assembling process is still complicated, and it is difficult to unify the light guiding plate and the integrated reflective member due to different materials thereof.

SUMMARY

Embodiments have been made in order to solve the above problems. It is an aspect of embodiments to provide a back light unit of a liquid crystal display device and a manufacturing method thereof capable of improving efficiency of a manufacturing process.

It is another aspect of embodiments to provide a back light unit of a liquid crystal display device and a manufacturing method thereof capable of reducing the number of components by modularizing the components.

In accordance with an aspect of embodiments, there is provided a back light unit including a light source; a light guiding plate which uniformly transmits a light beam generated by the light source; and a cover portion which forms an external appearance and fixes the light guiding plate, wherein a resin material is charged between the light guiding plate and the cover portion to couple the light guiding plate and the cover portion.

The light guiding plate and the resin material may be formed of the same material.

The light guiding plate and the cover portion may be coupled by insert injection molding.

The light guiding plate may include a pattern formation portion with an optical pattern and a light source coupling portion to couple the light source.

The cover portion may have a reflective portion which reflects the light beam onto the light guiding plate.

The cover portion may be formed of a metal material and the reflective portion is formed by performing a polishing process on a specified area of the cover portion.

In accordance with another aspect of embodiments, there is provided a back light unit including a light source; and a light guiding and reflecting module wherein a light guiding plate which uniformly transmits a light beam generated by the light source and a cover portion which has a reflective portion that reflects the light beam toward the light guiding plate and supports the light guiding plate are formed as a single body.

The light guiding and reflecting module may be formed by insert injection molding the light guiding plate and the cover portion.

The insert injection molding may charge a resin material equal to a material of the light guiding plate.

The back light unit may further include a diffusion sheet which diffuses the light beam passing through the light guiding plate and a prism sheet which controls a traveling direction of the light beam passing through the diffusion sheet.

In accordance with yet another aspect of embodiments, there is provided a method for manufacturing a back light unit, including molding a light guiding plate; molding a cover portion which fixes the light guiding plate; and charging a resin material between the light guiding plate and the cover portion and unifying the light guiding plate and the cover portion.

The light guiding plate may be injection molded of the same material as the resin material and the cover portion may be press molded.

The light guiding plate and the cover portion may be unified by insert injection molding.

p The molding of the cover portion may include forming a reflective portion by performing a polishing process on a specified area of the cover portion.

A light source coupling portion may be formed to fix a light source.

The light guiding plate may be injection molded and the cover portion may be press molded.

In accordance with another aspect of embodiments, there is provided a light guiding and reflecting module including a light guiding plate which uniformly transmits a light beam; and a cover portion which has a reflective portion that reflects the light beam toward the light guiding plate, wherein a resin material is charged between the light guiding plate and the cover portion to couple the light guiding plate and the cover portion to form a single body.

The light guiding plate and the cover portion may be coupled by insert injection molding.

The light guiding plate and the resin material may be formed of the same material.

BRIEF DESCRIPTION OF THE DRAWINGS

These and/or other aspects, features, and advantages of exemplary embodiments will become apparent and more readily appreciated from the following description of exemplary embodiments, taken in conjunction with the accompanying drawings, of which.

DETAILED DESCRIPTION OF EMBODIMENTS

Figure 1:
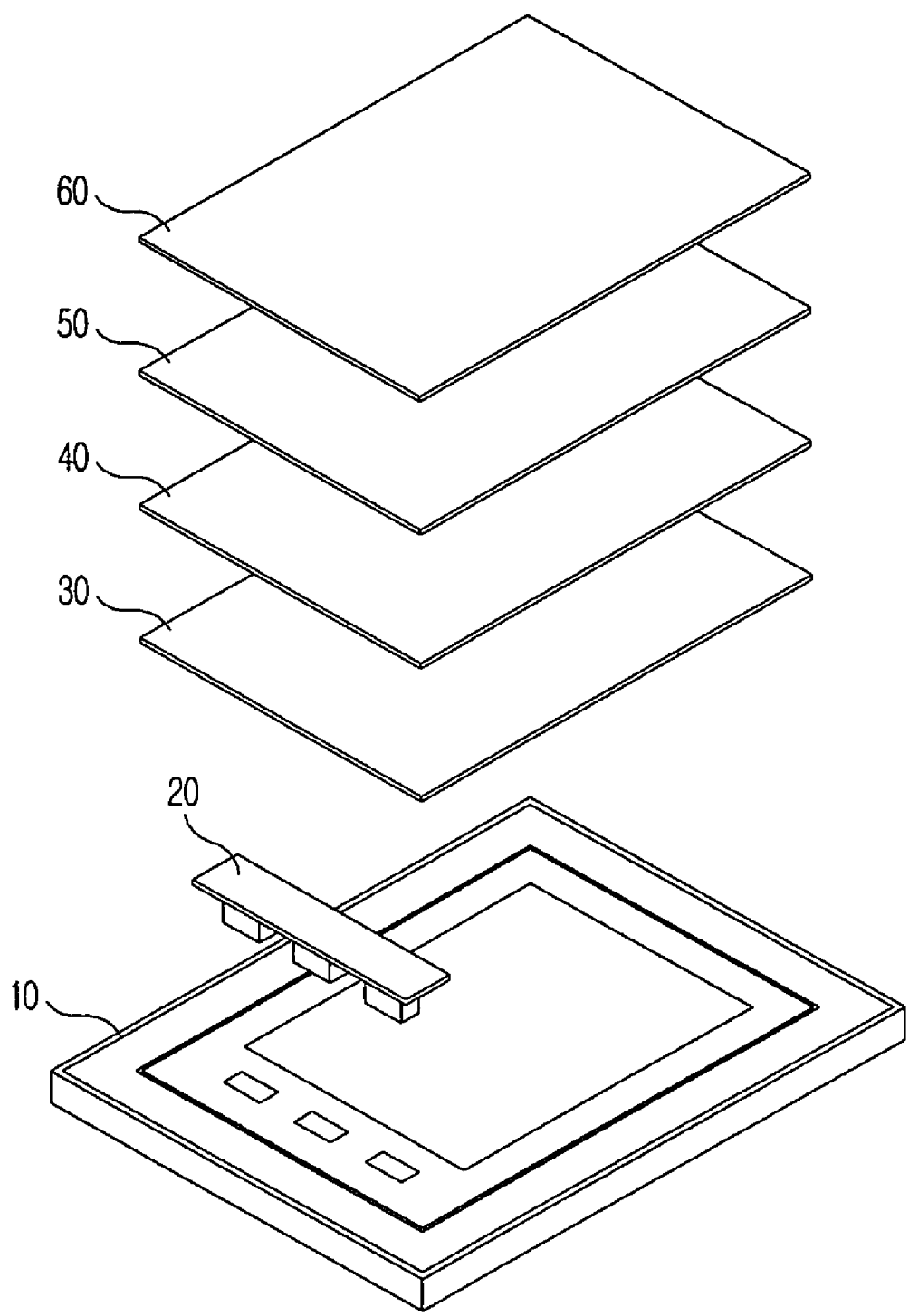
FIG. 1 illustrates an exploded perspective view of a back light unit of a liquid crystal display device according to an exemplary embodiment.

Reference will now be made in detail to exemplary embodiments, examples of which are illustrated in the accompanying drawings, wherein like reference numerals refer to like elements throughout. Exemplary embodiments are described below by referring to the figures.

Figure 2:
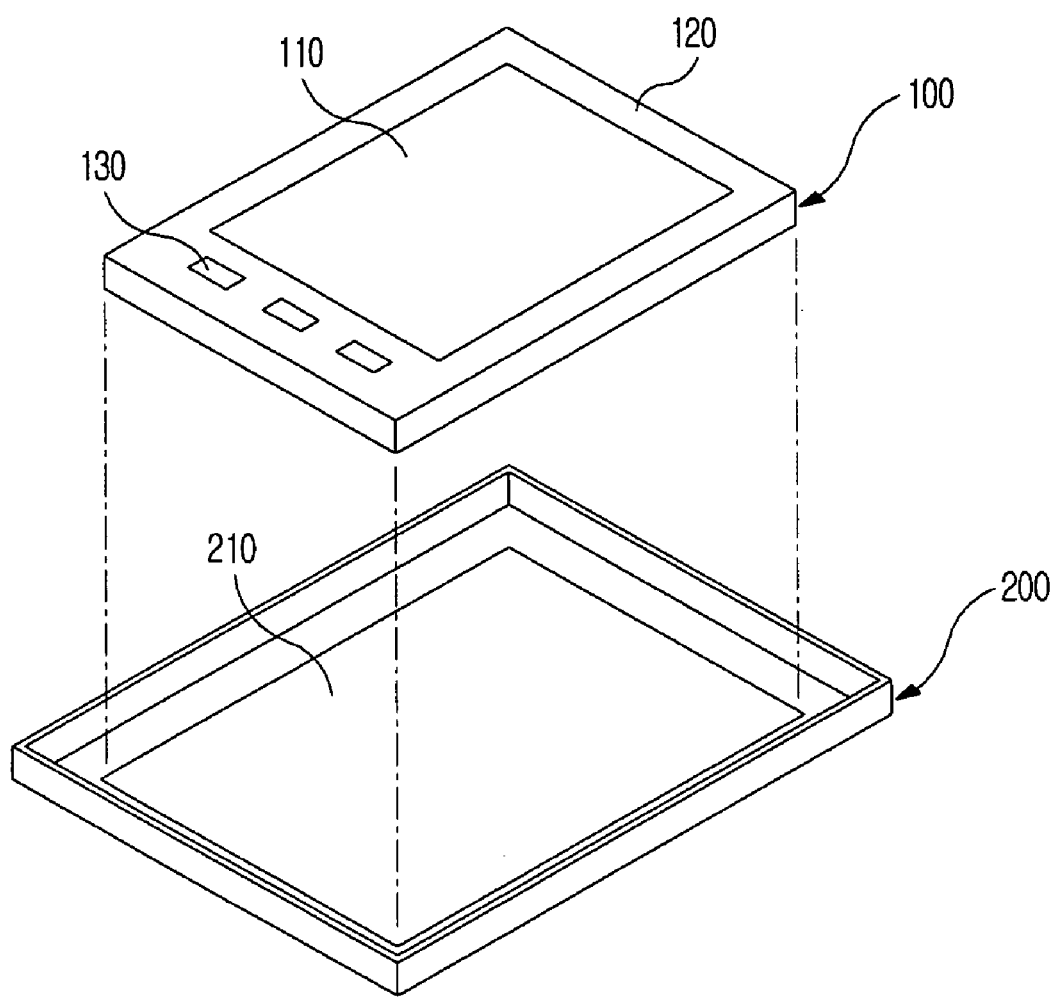
FIG. 2 illustrates an exploded perspective view of a light guiding and reflecting module of the back light unit according to an exemplary embodiment.
Figure 3A:
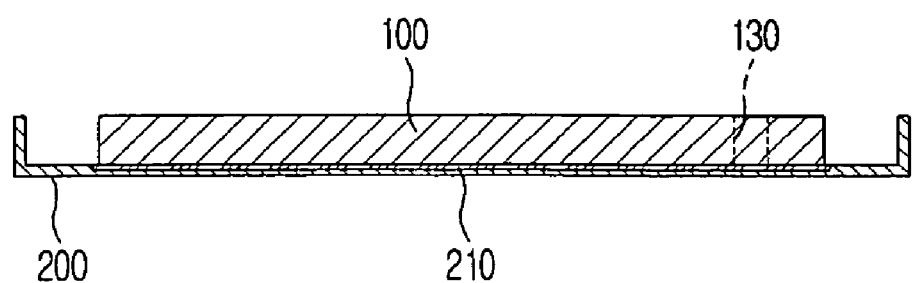
FIGS. 3A and 3B illustrate cross-sectional views showing a coupling of the light guiding and reflecting module of FIG. 2.
Figure 3B:
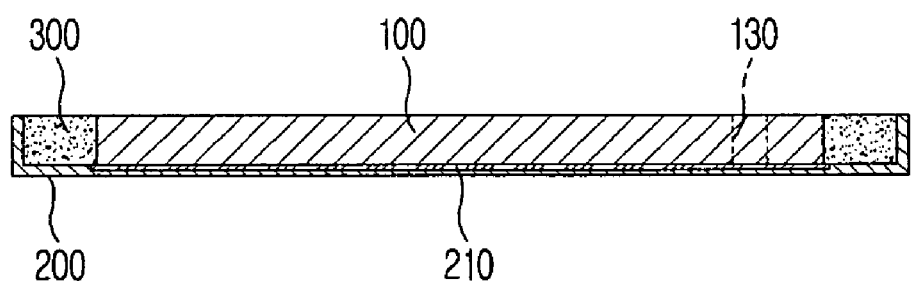

FIG. 1 illustrates an exploded perspective view of a back light unit of a liquid crystal display device according to an exemplary embodiment. FIG. 2 illustrates an exploded perspective view of a light guiding and reflecting module of the back light unit according to an exemplary embodiment. FIGS. 3A and 3B illustrate cross-sectional views showing a coupling of the light guiding and reflecting module of FIG. 2.

As shown in FIGS. 1 and 2, an exemplary embodiment of a back light unit includes a light source 20 which generates a light beam, optical sheets 30, 40, 50 and 60, and a light guiding and reflecting module 10 wherein a cover portion 200 which fixes the optical sheets 30, 40, 50 and 60 and has a reflective portion 210 and a light guiding plate 100 are formed as a single body.

The light source 20 serves to emit light at the beginning. Although various lamps may be used as a light source, a cold cathode fluorescence lamp (CCFL) is generally used as a light source in the liquid crystal display device. The cold cathode fluorescence lamp is similar to a fluorescence lamp, but it does not emit heat and provides very bright white light with low power consumption. In the cases of an information and communication apparatus and a small-sized mobile phone, a light emitting diode (LED) is used as a small-sized light source.

Further, although not shown in the drawings, the light source 20 is connected to a control circuit to turn the light source on.

The optical sheets 30, 40, 50 and 60 include a diffusion sheet 30, prism sheets 40 and 50 and a protection sheet 60.

The diffusion sheet 30 uniformly diffuses the light beam emitted from the light guiding plate 100 on a liquid crystal display panel (not shown) to expand a viewing angle and cover an optical pattern formed on the light guiding plate 100.

The prism sheets 40 and 50 refract and collect the light beam emitted from the diffusion sheet 30 to increase light brightness. When the light beam passes through the diffusion sheet 30, the light beam is diffused in both horizontal and vertical directions perpendicular to a plane, thereby rapidly reducing the light brightness.

The prism sheets 40 and 50 focus the light again to increase the light brightness by using two nearly horizontal and vertical sheets as a set.

The protection sheet 60 is a protection film to prevent contamination or the like due to introduction of foreign matter applied to the back light unit. The protection sheet 60 is disposed on the prism sheets 40 and 50 to prevent damage of the prism sheets 40 and 50 and the Moire phenomenon generated when the prism sheets 40 and 50 are used as a set of vertical and horizontal sheets. The Moire is a peculiar pattern of a low frequency which is generated due to a beating phenomenon when two or more periodic patterns having similar periods overlap each other.

Further, the protection sheet 60 also serves to expand the viewing angle which is narrowed by the prism sheets 40 and 50. However, recently, as the function of the prism sheets 40 and 50 is improved, a configuration without an additional protection sheet is possible.

An exemplary embodiment of a back light unit includes the light guiding and reflecting module 10. In the light guiding and reflecting module 10, as shown in FIG. 2, the light guiding plate 100 which uniformly transmits the light beam of the light source 20 and the cover portion 200, which fixes the optical sheets 30, 40, 50 and 60 and has the reflective portion 210 that reflects the light beam toward the light guiding plate 100, are formed as a single body.

The light guiding plate 100 functions as a light lens which projects light emitted from the light source 20 onto the inside thereof to form a uniform plane light source on an upper surface. Generally, a light emitting diode used as the light source 20 is positioned at a periphery of the liquid crystal display panel. Accordingly, the light beam is not transmitted uniformly through the entire surface and the periphery tends to be brighter.

Thus, the light guiding plate 100 is used to uniformly transmit the light beam of the light source 20 through the entire surface.

The light guiding plate 100 is injection molded of transparent resin such as polymethyl methacrylate (PMMA resin)

or polycarbonate (PC resin). A pattern formation portion 110 with an optical pattern is disposed at the central side of the light guiding plate 100, and a pattern non-formation portion 120 is formed at the edge side of the light guiding plate 100. Further, a light source coupling portion 130 is formed in a hole shape at one side of the pattern non-formation portion 120 to insert and couple the light source 20. Accordingly, the light source 20 can be directly coupled to the light guiding plate 100, thereby omitting a light source fixing configuration such as a mold frame used in a conventional technology.

In this case, a mold for injection molding the light guiding plate 100 is manufactured such that the pattern formation portion 110, the pattern non-formation portion 120 and the light source coupling portion 130 are formed on the light guiding plate.

The cover portion 200 is formed of a stainless steel material by press molding. The reflective portion 210 serving as a mirror is formed by a polishing process at a position corresponding to the pattern formation portion 110 of the light guiding plate 100. In this case, an additional reflecting plate may be fixed to an inner surface of the cover portion 200. However, in order to reduce the number of components, it is preferable to form the reflective portion 210 by performing a polishing process on the cover portion 200.

The light guiding plate 100 and the cover portion 200 are unified by insert injection molding to form the light guiding and reflecting module 10.

The insert injection molding is a molding method of placing components made of metal or other materials in a mold and charging a resin material to perform injection molding, wherein the components are loaded in the mold and resin is injected to cover the components with melted resin and solidify them, thereby forming composite components as a single body.

Thus, as shown in FIGS. 3A and 3B, the press molded cover portion 200 is inserted into any cavity of a mold (not shown) and the light guiding plate 100 is inserted into the other cavity (FIG. 3A). Then, a resin material 300 is injected and the resin material 300 charged between the light guiding plate 100 and the cover portion 200 is solidified, thereby forming the light guiding and reflecting module 10 in which the light guiding plate 100 and the cover portion 200 are formed as a single body (FIG. 3B).

In this case, preferably, the resin material 300 employs transparent resin such as polymethyl methacrylate (PMMA resin) or polycarbonate (PC resin) which is used in the injection molding of the light guiding plate. Accordingly, both the molding of the light guiding plate 100 and the molding of the light guiding and reflecting module 10 can be performed using a general injection molding machine having a single nozzle.

As described above, since the light guiding and reflecting module 10 is formed as a single body, there is an effect of reducing the number of operations generated in an assembly step of assembling a light guiding plate, a reflecting plate, a mold frame and a bezel, which are separately provided, as in a conventional technology.

Hereinafter, a manufacturing method of the back light unit according to an exemplary embodiment will be described with reference to the accompanying drawings.

First, the light guiding plate 100 is injection molded (first step), and the cover portion 200 is press molded through an additional step (second step).

In this case, the pattern formation portion 110 is formed on the light guiding plate 100 molded through the first step. The light source coupling portion 130 to which the light source 20 is inserted and fixed is formed at one side edge of the light guiding plate 100.

Further, the reflective portion 210 on which a polishing process has been performed is formed on the cover portion 200 which is press molded through the second step at a position corresponding to the pattern formation portion 110 of the light guiding plate 100.

The light guiding plate 100 and the cover portion 200 are insert injection molded, thereby completing the light guiding and reflecting module 10 formed as a single body (third step).

In the injection molding of the first and third steps, the injection molding is performed using a resin material. Accordingly, since the steps are performed using a general injection molding machine having a single nozzle, it is possible to manufacture a light guiding and reflecting module without an additional investment in equipment.

The light guiding and reflecting module is formed by unifying the light guiding plate, the reflecting plate, the mold frame and the bezel used in a conventional technology. Since the light guiding and reflecting module is manufactured through an injection and press process without an additional assembling process, there is an effect of omitting a complicated assembling process.

Then, the light source 20 is coupled to the light source coupling portion 130 of the light guiding plate 100 and a plurality of optical sheets 30, 40, 50 and 60 are fixed to an upper portion of the light guiding and reflecting module 10, thereby completing an assembly of the back light unit.

Thus, in the back light unit according to an exemplary embodiment, it is possible to reduce the manufacturing cost due to a simple assembling process. Further, it is possible to slim the back light unit by unifying the light guiding plate, the reflecting plate, the mold frame and the bezel into a module.

As described above, in the back light unit and the manufacturing method thereof according to an exemplary embodiment, it is possible to omit a complicated assembling process and to slim the back light unit by unifying the light guiding plate, the reflecting plate, the mold frame and the bezel into a module.

Further, according to an exemplary embodiment, in the injection molding of the first and third steps, the injection molding is performed using the same resin material. Accordingly, since the steps are performed using a general injection molding machine having a single nozzle, it is possible to manufacture a light guiding and reflecting module without an additional investment in equipment.

Although a few exemplary embodiments have been shown and described, it would be appreciated by those skilled in the art that changes may be made in these exemplary embodiments, the scope of which is defined in the claims and their equivalents.

What is claimed is:

1. A back light unit comprising:
   a light source;
   a light guiding plate which uniformly transmits a light beam generated by the light source; and
   a cover portion which forms an external appearance and fixes the light guiding plate, the cover portion having a reflective portion which reflects the light beam onto the light guiding plate,
   wherein a resin material is charged between the light guiding plate and the cover portion to couple the light guiding plate and the cover portion, and the cover portion is formed of a metal material and the reflective portion is formed by performing a polishing process on a specified area of the cover portion.

2. The back light unit according to claim 1, wherein the light guiding plate and the resin material are formed of the same material.

3. The back light unit according to claim 1, wherein the light guiding plate and the cover portion are coupled by insert injection molding.

4. The back light unit according to claim 1, wherein the light guiding plate includes a pattern formation portion with an optical pattern and a light source coupling portion to couple the light source.

5. The back light unit according to claim 1, wherein the light guiding plate is injection molded and the cover portion is press molded.

6. A back light unit comprising:
a light source; and
a light guiding and reflecting module wherein a light guiding plate which uniformly transmits a light beam generated by the light source and a cover portion which has a reflective portion that reflects the light beam toward the light guiding plate and supports the light guiding plate are formed as a single body,
wherein a resin material is charged between the light guiding plate and the cover portion to couple the light guiding plate and the cover portion, and
wherein the cover portion is formed of a metal material and the reflective portion is formed by performing a polishing process on a specified area of the cover portion.

7. The back light unit according to claim 6, wherein the light guiding and reflecting module is formed by insert injection molding the light guiding plate and the cover portion.

8. The back light unit according to claim 7, wherein the insert injection molding is to charge a resin material equal to a material of the light guiding plate.

9. The back light unit according to claim 6, further comprising a diffusion sheet which diffuses the light beam passing through the light guiding plate and a prism sheet which controls a traveling direction of the light beam passing through the diffusion sheet.

10. A method for manufacturing a back light unit, comprising:
molding a light guiding plate;
molding a cover portion which fixes the light guiding plate; and
charging a resin material between the light guiding plate and the cover portion and unifying the light guiding plate and the cover portion,
wherein molding the cover portion includes forming a reflective portion by performing a polishing process on a specified area of the cover portion.

11. The method according to claim 10, wherein the light guiding plate is injection molded of the same material as the resin material and the cover portion is press molded.

12. The method according to claim 10, wherein the light guiding plate and the cover portion are unified by insert injection molding.

13. The method according to claim 10, wherein light guiding plate comprises a light source coupling portion to fix a light source.

14. A light guiding and reflecting module comprising:
a light guiding plate which uniformly transmits a light beam; and
a cover portion which has a reflective portion that reflects the light beam toward the light guiding plate,
wherein a resin material is charged between the light guiding plate and the cover portion to couple the light guiding plate and the cover portion to form a single body, and the cover portion is formed of a metal material and the reflective portion is formed by performing a polishing process on a specified area of the cover portion.

15. The light guiding and reflecting module according to claim 14, wherein the light guiding plate and the cover portion are coupled by insert injection molding.

16. The light guiding and reflecting module according to claim 14, wherein the light guiding plate and the resin material are formed of the same material.

* * * * *

UNITED STATES PATENT AND TRADEMARK OFFICE
CERTIFICATE OF CORRECTION

PATENT NO. : 7,896,534 B2  
APPLICATION NO. : 12/155830  
DATED : March 1, 2011  
INVENTOR(S) : Jae Heon Noh et al.

Page 1 of 1

It is certified that error appears in the above-identified patent and that said Letters Patent is hereby corrected as shown below:

Title Page, Item (75) Inventors Column 1, Line 2 delete "Suwon-Si (JP)" and insert -- Suwon-Si (KR) --, therefor.

Signed and Sealed this

Thirty-first Day of May, 2011

David J. Kappos
*Director of the United States Patent and Trademark Office*